(12) United States Patent
Morimoto

(10) Patent No.: US 11,961,250 B2
(45) Date of Patent: Apr. 16, 2024

(54) LIGHT-FIELD IMAGE GENERATION SYSTEM, IMAGE DISPLAY SYSTEM, SHAPE INFORMATION ACQUISITION SERVER, IMAGE GENERATION SERVER, DISPLAY DEVICE, LIGHT-FIELD IMAGE GENERATION METHOD, AND IMAGE DISPLAY METHOD

(71) Applicant: TOPPAN PRINTING CO., LTD., Tokyo (JP)

(72) Inventor: Tetsuro Morimoto, Taito-ku (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 744 days.

(21) Appl. No.: 17/069,130

(22) Filed: Oct. 13, 2020

(65) Prior Publication Data
US 2021/0042948 A1 Feb. 11, 2021

Related U.S. Application Data

(63) Continuation of application No. PCT/JP2019/015745, filed on Apr. 11, 2019.

(30) Foreign Application Priority Data

Apr. 12, 2018 (JP) .................................. 2018-076786

(51) Int. Cl.
*G06T 7/557* (2017.01)
*G06T 7/90* (2017.01)
(Continued)

(52) U.S. Cl.
CPC ................ *G06T 7/557* (2017.01); *G06T 7/90* (2017.01); *H04N 13/122* (2018.05); *H04N 13/15* (2018.05)

(58) Field of Classification Search
CPC .......... G06T 7/557; G06T 7/90; G06T 17/00; G06T 2200/21; G06T 2207/10052;
(Continued)

(56) References Cited

U.S. PATENT DOCUMENTS 10,275,898 B1 * 4/2019 Song .................... H04N 13/243
11,650,354 B2 * 5/2023 Karafin ................. G06T 15/205
345/419
(Continued)

FOREIGN PATENT DOCUMENTS

JP 2000-285260 A 10/2000
JP 2000-333211 A 11/2000
(Continued)

OTHER PUBLICATIONS

International Search Report dated Jul. 2, 2019 in PCT/JP2019/015745, filed Apr. 11, 2019, (with English Translation).
(Continued)

*Primary Examiner* — Santiago Garcia
(74) *Attorney, Agent, or Firm* — Oblon, McClelland, Maier & Neustadt, L.L.P.

(57) ABSTRACT

A light-field image generation system including a shape information acquisition server that acquires shape information indicating a three-dimensional shape of an object, and an image generation server that is provided with a shape reconstruction unit that reconstructs the three-dimensional shape of the object as a virtual three-dimensional shape in a virtual space based on the shape information and a light-field image generation unit that generates a light-field image of the virtual three-dimensional shape at a predetermined viewing point in the virtual space.

15 Claims, 13 Drawing Sheets

(51) Int. Cl.
*H04N 13/122* (2018.01)
*H04N 13/15* (2018.01)

(58) Field of Classification Search
CPC .......... G06T 19/00; G06T 2207/10028; H04N 13/122; H04N 13/15; H04N 13/275; H04N 13/344; H04N 13/395; G02B 2027/0127; G02B 2027/0134; G02B 30/10
See application file for complete search history.

(56) References Cited

U.S. PATENT DOCUMENTS

| | | | | |
|---|---|---|---|---|
| 2006/0181720 | A1* | 8/2006 | Kakutani | H04N 1/405 358/1.9 |
| 2016/0307372 | A1* | 10/2016 | Pitts | H04N 23/957 |
| 2018/0035134 | A1* | 2/2018 | Pang | H04N 13/117 |
| 2018/0089903 | A1* | 3/2018 | Pang | H04N 23/45 |
| 2018/0097867 | A1* | 4/2018 | Pang | H04N 5/2226 |
| 2019/0079158 | A1* | 3/2019 | Karafin | H04N 23/68 |
| 2019/0236796 | A1* | 8/2019 | Blasco Claret | G06T 7/557 |
| 2020/0201036 | A1* | 6/2020 | Hong | H04N 13/302 |

FOREIGN PATENT DOCUMENTS

| | | |
|---|---|---|
| JP | 2008-263528 A | 10/2008 |
| JP | 2014-004656 A | 1/2014 |
| KR | 10-1670970 B1 | 11/2016 |
| KR | 101670970 B1 | 11/2016 |

OTHER PUBLICATIONS

Extended European Search Report dated Apr. 8, 2021 in European Patent Application No. 19784488.9, 7 pages.
Gordon-Wetzstein-Stanford: "Light Field Technology: the Future of VR and 3D Displays", Youtube, Mar. 22, 2016, XP054981611, Retrieved from the Internet: URL: https://www.youtube.com/watch?v=c8Ge08MwSLO [retrieved on Mar. 22, 2021], 1 page.
Japanese Office Action dated Feb. 21, 2023 in Japanese Patent Application No. 2020-513445 (with English language translation), 8 pages.
Office Action dated Oct. 28, 2023 issued in corresponding Chinese Patent Application No. 201980025186.7 with English Machine Translation.

* cited by examiner

LIGHT-FIELD IMAGE GENERATION SYSTEM, IMAGE DISPLAY SYSTEM, SHAPE INFORMATION ACQUISITION SERVER, IMAGE GENERATION SERVER, DISPLAY DEVICE, LIGHT-FIELD IMAGE GENERATION METHOD, AND IMAGE DISPLAY METHOD

CROSS-REFERENCE TO RELATED APPLICATIONS

The present application is a continuation of International Application No. PCT/JP2019/015745, filed Apr. 11, 2019, which is based upon and claims the benefits of priority to Japanese Application No. 2018-076786, filed Apr. 12, 2018. The entire contents of these applications are incorporated herein by reference.

BACKGROUND OF THE INVENTION

Field of the Invention

The present invention relates to a light-field image generation system, an image display system, a shape information acquisition server, an image generation server, a display device, a light-field image generation method, and an image display method.

Discussion of the Background

Workers may have difficulty in working directly at dangerous places or remote sites where there is an object to be dealt with.

Thus, teleoperated systems are used to conduct work on an object by operating machinery installed near the object from a remote site. The teleoperated system includes a robot for executing work on an object and a teleoperated device to remotely operate the robot in a wireless manner (for example, JP-2014-004656 A).

In the foregoing teleoperated system, a worker wearing a head mounted display (hereinafter, called HMD) on their head conducts work on an object while observing images captured by an imaging device arranged at the work site.

In this case, during the observation of the object with the general HMD, the worker obtains the depth information of the object by ocular convergence and reconstructs a three-dimensional shape in his/her brain.

Meanwhile, during observation of the object, the worker focuses his/her eye lens on the display surface of the HMD where the image of the object is displayed. Thus, the worker's eye does not focus on the depth position recognized by ocular convergence. Hence, inconsistency between the ocular convergence and the focus adjustment may occur.

Accordingly, teleoperation using the HMD may cause the worker to suffer from eyestrain or visually induced fatigue due to the inconsistency between the ocular convergence and the focus adjustment, and have trouble in performing work (especially, work requiring delicate operations).

In addition, a worker suffering from eyestrain or visually induced fatigue may not perform teleoperation using the HMD for a long time.

To solve the inconsistency between the ocular convergence and the focus adjustment caused by the HMD, there have been developed HMDs using a display based on light-field techniques.

Such HMDs use light-field information (information of light rays emerging from the surface of an object) to allow the worker to visually recognize the depth of the object (the three-dimensional shape of the object) in one image and reconstruct the three-dimensional shape of the object in his/her brain.

SUMMARY OF THE INVENTION

According to an aspect of the present invention, a light-field image generation system includes a shape information acquisition server that acquires shape information indicating a three-dimensional shape of an object, and an image generation server including a shape reconstruction unit that reconstructs the three-dimensional shape of the object as a virtual three-dimensional shape in a virtual space based on the shape information, and a light-field image generation unit that generates a light-field image of the virtual three-dimensional shape at a predetermined viewing point in the virtual space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
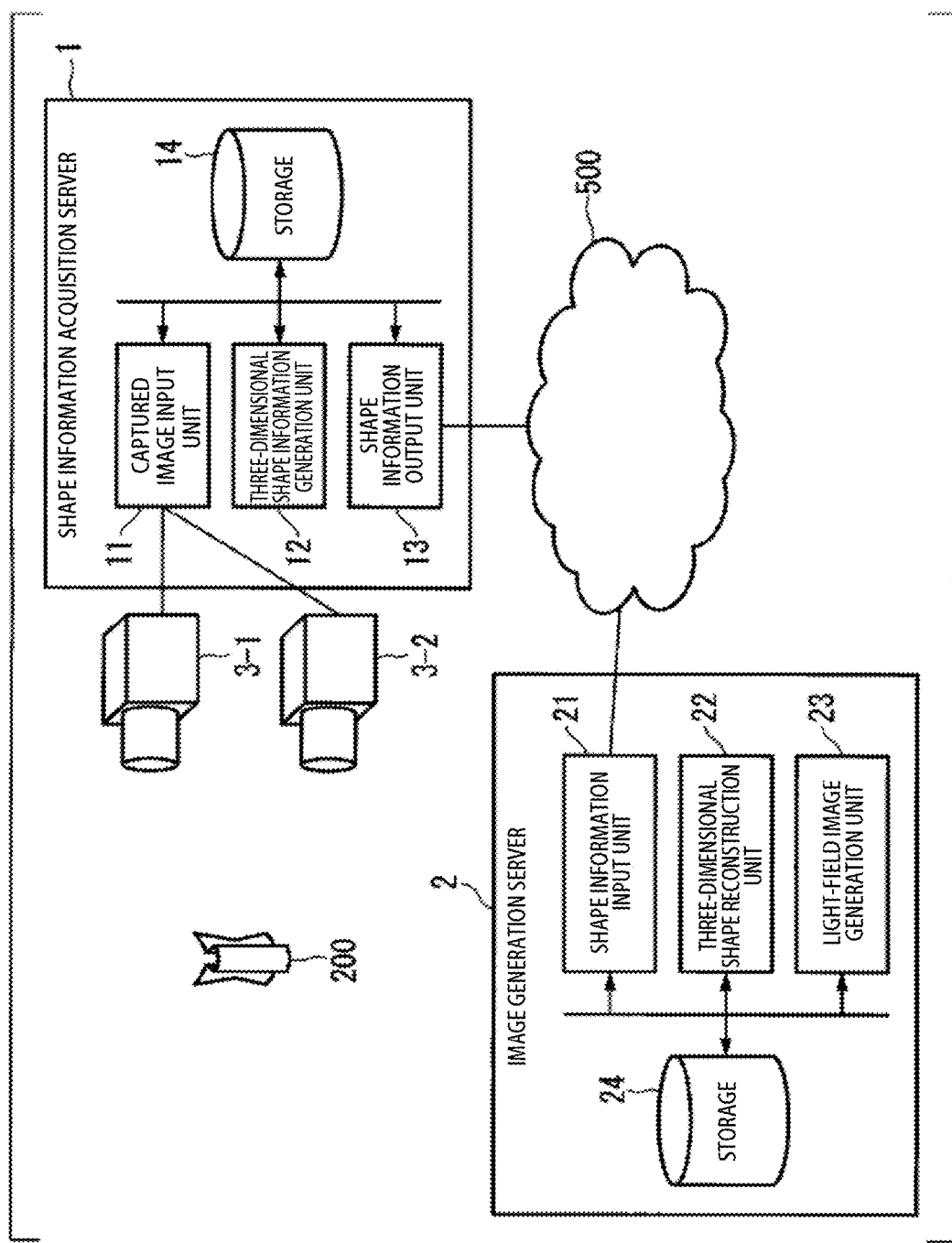
FIG. 1 is a diagram showing a configuration example of a light-field image generation system according to a first embodiment of the present invention.

The embodiments will now be described with reference to the accompanying drawings, wherein like reference numerals designate corresponding or identical elements throughout the various drawings.

First Embodiment

Hereinafter, a light-field image generation system according to a first embodiment of the present invention will be described with reference to the drawings. FIG. 1 is a diagram showing a configuration example of the light-field image generation system according to the first embodiment of the present invention.

Referring to FIG. 1, the light-field image generation system includes a shape information acquisition server 1 and an image generation server 2. The shape information acquisition server 1 and the image generation server 2 transmit and receive data via an information communication network 500. An imaging device 3_1 and an imaging device 3_2 capture images of an object 200 and output the captured images to the shape information acquisition server 1. Alternatively, when accessed from the shape information acquisition server 1, the imaging device 3_1 and the imaging device 3_2 capture images of the object 200 and output the captured images to the shape information acquisition server 1.

Each of the imaging device 3_1 and the imaging device 3_2 is a camera that captures, for example, two-dimensional images of the object 200, and output the captured images as three-dimensional shape information of the object 200 (a combination of three-dimensional point group information composed of feature points or depth information that is a depth image, and color information that is a color image) to the shape information acquisition server 1 (case #1). The imaging device 3_1 and the imaging device 3_2 capture images of the object 200 from different viewing points. In case #1, the imaging device 3_1 alone may capture two or more images from different viewing point.

Each of the imaging device 3_1 and the imaging device 3_2 is, for example, an RGB-D camera (where R denotes red, G denotes green, B denotes blue, and D denotes depth), that captures two-dimensional images of the object 200, and outputs the captured images as three-dimensional shape information of the object 200 (the combination of the depth information and the color information) to the shape information acquisition server 1 (case #2). In case #2, the imaging device 3_1 alone may capture an image from one viewing point.

Each of the imaging device 3_1 and the imaging device 3_2 is, for example, three-dimensional measurement device, that outputs a three-dimensional point group composed of feature points indicating the three-dimensional shape of the object 200 as three-dimensional shape information of the object 200 (three-dimensional point group or depth image, and color information of the feature points) to the shape information acquisition server 1 using a light (laser light) section method or a fringe projection method (case #3). In case #3, the shape information is obtained from reflection light of radiated laser light, and thus color information of each of feature point in the three-dimensional point group is not acquired.

Each of the imaging device 3_1 and the imaging device 3_2 is, for example, a light-field camera (e.g. camera array type, coded aperture type, or micro-lens array type). It means light ray information is acquired from the images captured by the light-field cameras. From the acquired light ray information, the three-dimensional shape information of feature points indicating the three-dimensional shape of the object 200 (the three-dimensional point group information or the depth information that is the depth images) and color information of the feature points (for example, gradations of color components R, G, and B) are determined. The three-dimensional shape information is outputted to the shape information acquisition server 1 as three-dimensional shape information of the object 200 (case #4).

Otherwise, the captured images in the cases #1 to #4 are used to determine consistency among the depth information and the color information of the feature points determined from the captured images, and then the depth information and the color information are composited (the algorithm of composition will be described later). The result of the composition, the three-dimensional point group composed of the feature points indicating the three-dimensional shape of the object 200 is outputted as the three-dimensional information of the object 200 (the combination of the three-dimensional point group information or the depth information that is the depth images, and the color information) to the shape information acquisition server 1 (case #5).

The shape information acquisition server 1 includes a captured image input unit 11, a three-dimensional shape information generation unit 12, a three-dimensional shape information output unit 13, and a storage 14.

The captured image input unit 11 receives the three-dimensional shape information indicating the shape of the object 200 from the imaging device 3_1 and the imaging device 3_2, and temporarily writes and stores the information in the storage 14.

The three-dimensional shape information generation unit 12 reads the three-dimensional shape information from the storage 14. Then, based on the read information, the three-dimensional shape information generation unit 12 generates three-dimensional shape information including depth information (geometric information) and color information of the object 200 which is to be transmitted to the image generation server 2.

Case #1

By using a stereo matching method, the three-dimensional shape information generation unit 12 generates the geometric information of the object 200 as a three-dimensional point group of the feature points of the object 200 in a virtual three-dimensional space, based on the two images captured from different viewing points. When the two-dimensional images are color images, the three-dimensional shape information generation unit 12 adds gradations of the R component, G component, and B component as the gradation information of the feature points (the information of gradations of color components of RGB of the pixels corresponding to the feature points, that is, the color information formed from the gradations of the R component, G components, and B component) to the geometric information that is the depth information. Thereby, the three-dimensional information is generated.

Case #2

The three-dimensional shape information generation unit 12 transmits the gradation information of feature points of the three-dimensional shape and the depth information that is the geometric information supplied as the three-dimensional shape information from the imaging device 3_1 and the imaging device 3_2 to the image generation server 2. Thereby, the three-dimensional information is generated. Alternatively, the three-dimensional shape information generation unit 12 may generate a three-dimensional point group in a virtual three-dimensional space of feature points, based on the gradation information of feature points of the three-dimensional shape and the depth information supplied from the imaging device 3_1 and the imaging device 3_2. The three-dimensional point group may be set as the geometric information. When the gradation information of feature points of the three-dimensional point group (the depth information) indicates the gradations of the R component, G component, and B component, the three-dimensional shape information generation unit 12 adds the gradations of the R component, G component, and B component that are the gradation information of the feature points (the information of the gradations of the color components of RGB of the pixels corresponding to the feature points, that is, the color information) to the depth information that is the geometric information. Thereby, the three-dimensional shape information is generated.

Figure 2A:
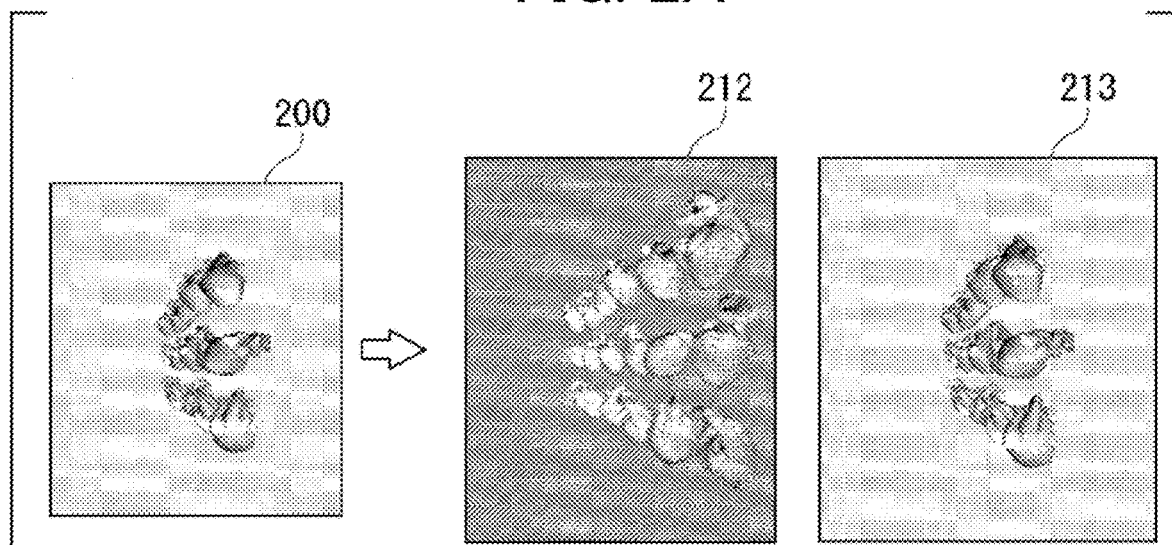
FIGS. 2A and 2B are conceptual diagrams of three-dimensional shape information and gradation information acquired from captured images.
Figure 2B:
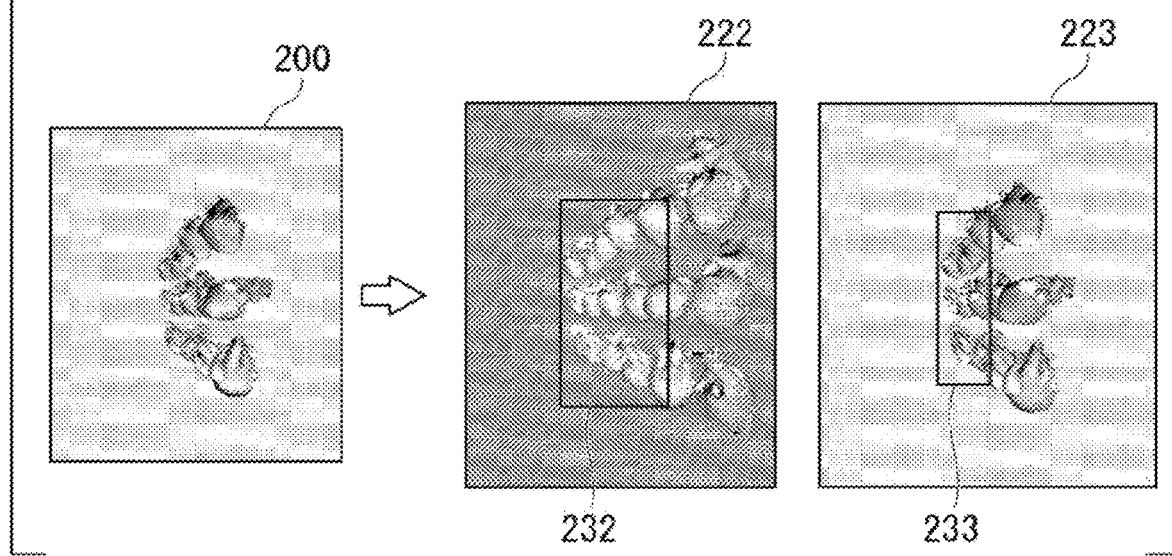

FIGS. 2A and 2B show conceptual diagrams of three-dimensional shape information and gradation information acquired from captured images. FIG. 2A shows depth information and gradation information as color information, acquired from an RGB-D camera. In this example, the depth information is a three-dimensional point group or a depth image (an image in which the depth is indicated by gradation). Each of the imaging device 3_1 and the imaging device 3_2 captures images of the object 200 (measures three-dimensional shape of the object 200), and generates, as three-dimensional shape information, depth information (display of gradation) 212 of feature points of the object 200 and gradation information 213 (color information) including gradations of the R component, G component, and B component of the feature points because the captured images are color images.

If a plurality of pieces of geometric information (three-dimensional point groups or depth information as depth images) is acquired from the RGB cameras based on a plurality of different viewing points, the three-dimensional shape information generation unit 12 integrates the feature points of the plurality of pieces of geometric information, generates the three-dimensional point groups or the depth images observable from the plurality of viewing points in a virtual three-dimensional space as the depth information, and adds the color information to the feature points of the depth information Thereby, the three-dimensional shape information is generated.

Case #3

Let us return to FIG. 1. The three-dimensional shape information generation unit 12 sets the three-dimensional point group composed of feature points in a virtual three-dimensional space indicating the three-dimensional shape of the object 200 supplied as the geometric information, to the three-dimensional shape information of the object 200. As already described, only the geometric shape is obtained from the reflection of laser light and the color information of the feature points in the three-dimensional point group is not obtained. Thus, the three-dimensional shape information includes only either the geometric information of the three-dimensional point group or the geometric information of the depth images.

However, capturing an image of the object 200 by another camera and acquiring consistency between the pixels of the captured image and the feature points of the three-dimensional point group make it possible to add the gradations of the R component, G component, and B component, as the color information, to the feature points in the three-dimensional point group or depth image. In this case, the three-dimensional shape information may include the depth information and the color information.

Case #4

The three-dimensional shape information generation unit 12 extracts light ray information from the images captured by the light-field cameras. Based on the light ray information, the three-dimensional shape information generation unit 12 generates three-dimensional point groups composed of feature points in a virtual three-dimensional space or depth images indicating the three-dimensional shape of the object 200 supplied as the geometric information, by using, for example, photogrammetry. The three-dimensional point groups are the geometric information of the object 200. When the images captured by the light-field cameras are color images, the three-dimensional shape information generation unit 12 adds the gradations of the R component, G component, and B component as color information to the feature points in the three-dimensional point groups. Thereby, the three-dimensional information is generated.

Case #5

The depth information and the color information (the three-dimensional shape information) obtained from the cases #1 to #4 are combined and composited to generate new three-dimensional shape information.

However, the imaging devices such as cameras, RGB-D cameras, three-dimensional measuring devices, and light-field cameras are different in resolution, geometric position and posture, lens skewness, and the like. Thus, before capturing images of the object 200, a plurality of images of a planar board with a grid or dot pattern printed thereon or a calibration target with a known three-dimensional shape is captured in various possible postures and positions using the imaging devices. Then, in correspondence with the shape of the calibration target seen in the capturing images, the relative positions, postures, and lens parameters of the imaging devices (cameras or the like) in the same three-dimensional space are estimated. Based on the estimation results, for the positions and postures of the imaging devices, it is necessary to have consistency among the imaging devices in the relative imaging positions and imaging directions in the same three-dimensional space. Accordingly, the feature points of the three-dimensional shape of the object 200 generated from the images captured by the imaging devices are composited and integrated in the same three-dimensional space, and the depth information and the color information are acquired in correspondence with the dense feature points in the integration results.

FIG. 2B shows the depth information and the gradation information acquired from the light-field camera and the RGB-D camera. Specifically, FIG. 2B shows the depth information and the color information (gradation information) that are obtained by compositing the geometric information (the three-dimensional point groups or the depth images) generated from the captured images obtained from the light-field camera and the RGB-D camera.

The light-field camera and the RGB-D camera capture images of the object 200, and generate, as the three-dimensional shape information, the depth information of feature points of the object 200, and the gradation information composed of the gradations of the R component, G component, and B component that are the color information of the feature points if the captured images are color images.

Then, depth information 232 generated by the image captured by the light-field camera is composited with depth information 222 (depth image) generated from the image captured by the RGB-D camera to generate the depth information of the object 200. Similarly, gradation information 233 calculated from the image captured by the light-field camera is composited with gradation information 223 calculated from the image captured by the RGB-D camera to generate the gradation information of the object 200 (the gradations of the R component, G component, and B component of the feature points as the color information).

The light-field camera has a smaller imaging region than that of the RGB-D camera because the light-field camera generally has a narrower angle of view than that of the RGB-D camera. On the other hand, the light-field camera has a higher resolution than that of the RGB-D camera and thus can acquire a larger number of feature points. Therefore, denser depth information and color information is acquired. Because of this, regions having sparse feature points and regions having dense feature points are generated in the depth information and the color information.

In another configuration, if there is a region to be partially observed in detail in the entire three-dimensional shape of the object 200, the region to be observed in detail is imaged by the light-field camera, and the dense feature points are determined using the captured image. Then, the depth information and the color information are each composited to complement the sparse feature points determined by the image captured by the RGB-D camera, based on the dense feature points determined by the image captured by the light-field camera.

At the respective composition of the depth information and the color information, the boundary between the region having dense feature points and the region having sparse feature points is shaded by gradation such that the number of the feature points gradually increases from the sparse region to the dense region. This makes the boundary less prominent when the user observes the light-field image. In contrast, if the boundary is required to be clarified, the region having sparse feature points and the region having dense feature points are simply composited to generate the depth information and the color information in the three-dimensional shape information of the object 200. Thus, the user can visually recognize the current observation region of the light-field camera, that is, the region having the dense region, more easily.

The three-dimensional shape information output unit 13 transmits the depth information and the color information generated as the three-dimensional shape information by the three-dimensional shape information generation unit 12 to the image generation server 2 via the information communication network 500 as the light-field information.

Figure 11:
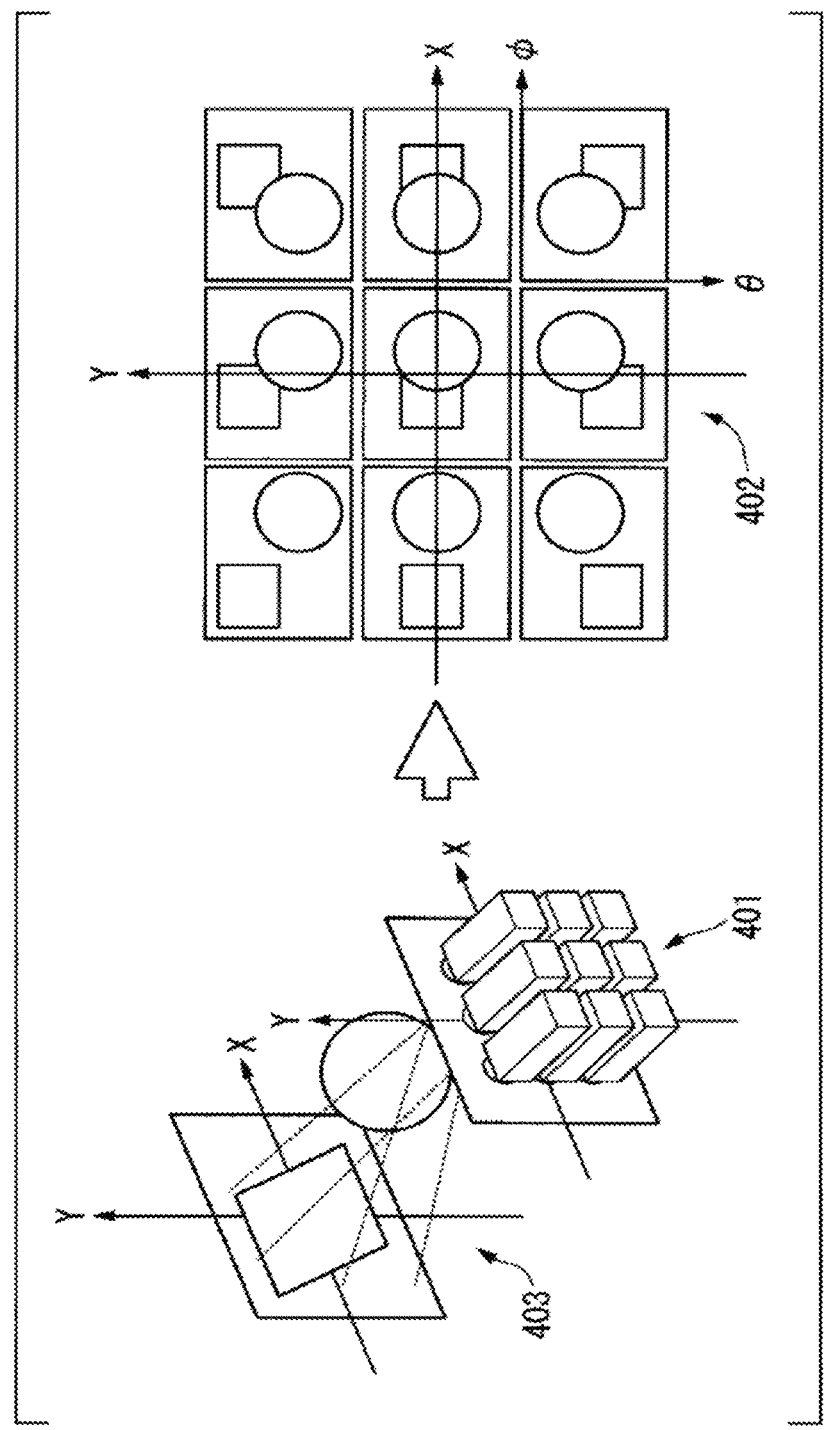
FIG. 11 is a conceptual diagram describing capture of a light-field image of an object.

When the light-field images are transmitted as the light-field information, as shown in FIG. 11, it is necessary to transmit n×m captured images, for example, 3×3, that is, nine captured images of nine different viewing points. As already described, each captured image has gradations of an R component, G component, and B component in each pixel. Thus, when the resolution of the captured images is raised or the light ray information to be acquired is increased, the data amount of the captured images further increases.

However, as the three-dimensional point group composed of the feature points of the object 200 in a virtual three-dimensional space, transmitting the depth information that is the geometric information of the object 200 and the color information of the feature points as the three-dimensional shape information makes it possible to decrease the amount of the data to be transmitted. Moreover, the light-field information can be transmitted at high speed as compared to the case of the conventional transmission of light-field images.

As for the transmission, the feature points of the geometric information in the three-dimensional shape information are converted into consistent depth images and color images. Then they are transmitted. This makes it possible to, by using the light-field images and the RGB-D images, transmit the depth information and color information including the regions having sparse feature points and the regions having dense feature points in the three-dimensional information as the light-field information while retaining the information of the feature points in the sparse regions and the dense regions, from the shape information acquisition server 1 to the image generation server 2.

Figure 12:
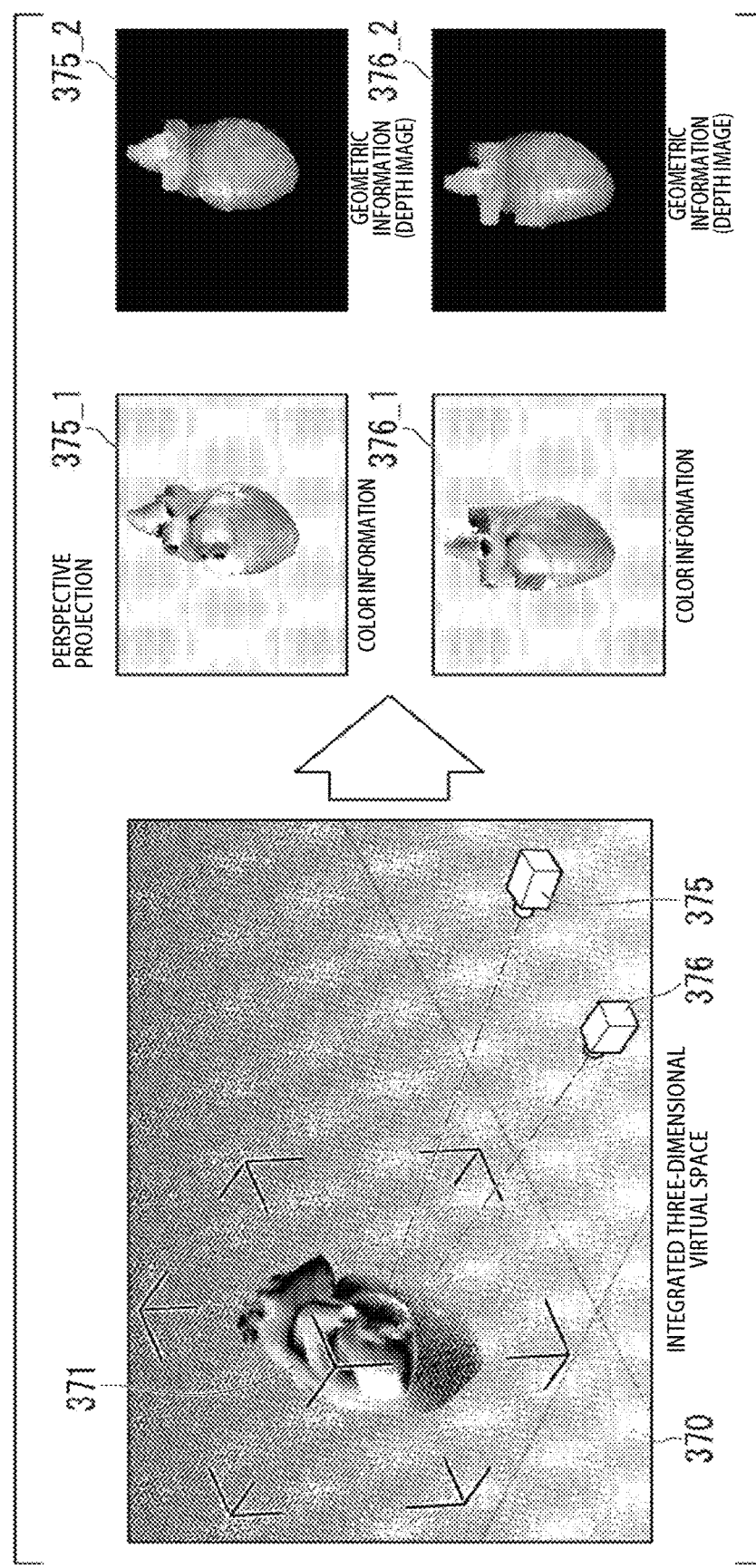
FIG. 12 is a diagram describing generation of depth images (images in which the depth is indicated by gradation) and color images representing three-dimensional shape information of the object 200.

FIG. 12 is a diagram describing generation of depth images and color images representing the three-dimensional shape information of the object 200. In FIG. 12, there is a virtual three-dimensional shape 371 of the object 200 in a virtual three-dimensional space 370. The virtual three-dimensional shape 371 is generated by using light-field images and RGB-D images as described above, and thus has regions having dense feature points and regions having sparse feature points. In the virtual three-dimensional space 370, the virtual three-dimensional shape 371 is captured by virtual cameras 375 and 376. Then, color information (color image) 375_1 and depth information (depth image) 375_2 are generated from the image captured by the virtual camera 375 (right side camera on the figure) (actually, a projected image, that is, an orthographic projection image). In addition, color information (color image) 376_1 and depth information (depth image) 376_2 are generated from the image captured by the virtual camera 376 (left side camera on the figure) (actually, a projected image, that is, an orthographic projection image).

The color information 375_1 and 376_1, and the depth information 375_2 and 376_2 are outputted to the shape information acquisition server 1 as the three-dimensional shape information of the object 200.

Transmitting the depth information as the depth images makes it possible to reduce the data amount as compared to the case of transmitting the coordinate values of feature points of a three-dimensional point group in a three-dimensional space. The depth images are transmitted by using a general image compression algorithm to further decrease the data amount. This is especially effective in the transmission of a moving image.

In the case of transmitting a polygon, data is required for indicating the shape and coordinate values of the polygon and data indicating the positions where texture is to be pasted. This significantly increases the data amount.

Instead of using a sphere or a column to orthographically project the feature points in the three-dimensional shape information as a captured image onto the two-dimensional plane described above, the depth information and the color information of the feature points in the three-dimensional shape information may be associated with position information and UV unwrapped as the depth image and the color image, respectively. Thereby, the three-dimensional shape information can be transmitted as images similar to those shown in FIG. 12.

Figure 13B:
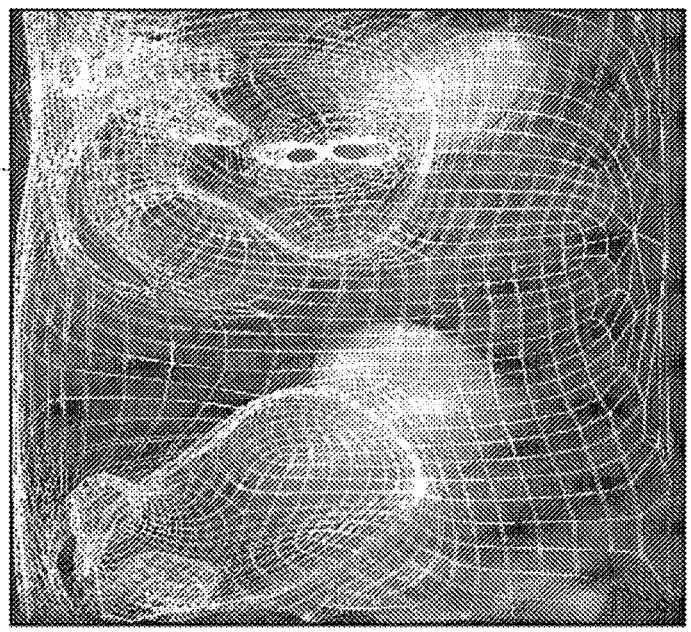
FIGS. 13A and 13B are diagrams describing generation of a depth image and a color image representing UV unwrapped three-dimensional shape information of the object 200.
Figure 13A:
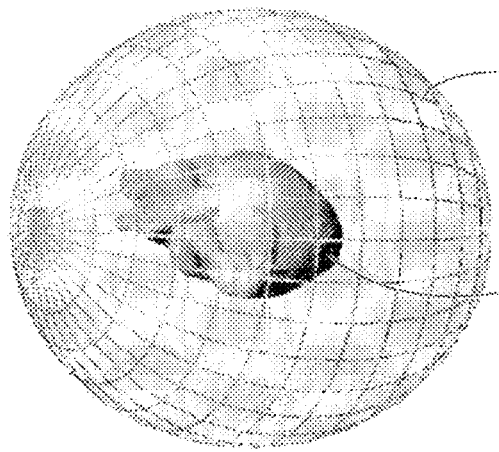

FIGS. 13A and 13B are diagrams describing generation of a depth image and a color image using UV unwrapping, each showing the three-dimensional shape information of the object 200.

In a virtual three-dimensional space 350, a virtual three-dimensional shape 351 of the object 200 is generated. Similarly to the case shown in FIG. 12, the virtual three-dimensional shape 351 is generated by using light-field images and RGB-D images, and thus has regions having dense feature points and regions having sparse feature points.

In the virtual three-dimensional space 350, a sphere 352 containing the virtual three-dimensional shape 351 is generated in which the center is at the barycenter of the virtual three-dimensional shape 351. The color information (color image) of the feature points in the virtual three-dimensional shape 351 is projected (UV unwrapped) onto the inner surface of the sphere 352 to generate a color image 360. Then, a depth image (not shown) is generated on the projected part such that depth information indicating the distances from the sphere 352 to the feature points is set as gradation information.

Referring to FIGS. 13A and 13B, similarly to the case shown in FIG. 12, the virtual three-dimensional shape 351 is generated by using the light-field images and RGB-D images as described above, and thus has regions having dense feature points and regions having sparse feature points.

Transmitting the depth information as the depth images makes it possible to reduce the data amount as compared to the case of transmitting the coordinate values of feature points of a three-dimensional point group in a three-dimensional space. The depth images are transmitted by using a general image compression algorithm to further decrease the data amount. This is especially effective in the transmission of moving images.

In either of the cases shown in FIGS. 12, 13A and 13B, the regions having dense feature points and the regions having sparse feature points are different in resolution and thus these regions need to be separately transmitted.

Using the UV unwrapping shown in FIGS. 13A and 13B makes it possible to increase the viewing angle as compared to the case shown in FIG. 12 and transmit the images of the object 200 with the omnidirectional three-dimensional shape information (the depth information and the color information).

The image generation server 2 includes a three-dimensional shape information input unit 21, a three-dimensional shape reconstruction unit 22, a light-field image generation unit 23, and a storage 24.

The three-dimensional shape information input unit 21 inputs the three-dimensional shape information including the depth information that is geometric information indicating the shape of the object 200 and the color information of feature points in the geometric information from the shape information acquisition server 1, and temporarily writes and stores the information in the storage 24.

The three-dimensional shape reconstruction unit 22 reconstructs (restores) the three-dimensional shape of the object 200 based on the three-dimensional shape information including the depth information and the color information, as a virtual three-dimensional shape. The restoration of the three-dimensional shape is performed by any of the generally used methods for restoring a three-dimensional shape.

In the restoration method, a virtual three-dimensional shape to be restored may need fineness (neatness) depending on purposes of using the light-field image generation system. Any of the following restoration methods can be selected as appropriate in accordance with the required fineness corresponding to the intended use.

An example of a virtual three-dimensional shape may be a virtual three-dimensional shape (three-dimensional shape model) obtained by restoring a three-dimensional point group or a depth image of a geometric shape. Another example of a virtual three-dimensional shape may be a virtual three-dimensional shape (three-dimensional shape model) obtained by calculating three-dimensional coordinates of feature points using a three-dimensional point group of a geometric shape or a depth image to determine higher-density point group data (dense point cloud) and restoring the high-density point group data. Still another example of a virtual three-dimensional shape may be a final virtual three-dimensional shape (three-dimensional shape model) obtained by calculating three-dimensional coordinates of feature points using the three-dimensional point group of a geometric shape or a depth image to determine higher-density point group data, generating mesh data from the point group data, and complementing colors of the mesh data in correspondence with the RGB gradations of the feature points.

The three-dimensional shape of the object 200, for example, the data of the three-dimensional shape generated by computer graphics (CG) may be stored in advance in the storage 24 so that the data is composited with the restored virtual three-dimensional shape described above.

For example, in the case an inside of a stomach is captured by a camera provided in an endoscope, if the captured region is narrow (the angle of view is narrow), an unskilled person may have difficulty in determining where in the stomach has been captured. To deal with such a situation, the three-dimensional shape reconstruction unit 22 may be configured to read, from the storage 24, the three-dimensional shape of a stomach generated in advance by CG, and composite the same with the restored virtual three-dimensional shape.

This allows the light-field image generation unit 23 to generate a light-field image in which the virtual three-dimensional shape is focused, in the heart of the three-dimensional shape generated by CG. The user can view the light-field image and clearly recognize the part of the heart in the entire image observed by him/herself using the endoscope.

The data of the three-dimensional shape of the heart is generated using CG, based on images produced by magnetic resonance imaging (MRI), for example. The geometric consistency with the position of imaging under the endoscope is achieved in advance, so that the CG-based three-dimensional shape and the virtual three-dimensional shape are arranged at consistent positions in the same three-dimensional space.

The technique for compositing the CG-based three-dimensional shape and the virtual three-dimensional shape can be used as an MR (Mixed Reality, i.e. superimposing a CG-based virtual image on a real image) manual. For example, in the case of dismantling the engine of an automobile, the virtual three-dimensional image of a part of the engine observed by the user is composited with the three-dimensional shape of the entire engine generated by CG. Then, information on what screw should be removed first for dismantlement and images describing the names of the positions and the functions are superimposed on the composited image, to thereby form a three-dimensional shape. The light-field image generation unit 23 generates a light-field image in a three-dimensional space, based on a composition of the CG-generated three-dimensional image of the engine, the virtual three-dimensional shape of the region observed by the user, and an image describing instructions. This allows the user to observe an augmented reality (AR) image and learn how to dismantle the engine and the functions of the components even if he/she is unskilled.

By using virtual cameras (virtual imaging devices) in the virtual three-dimensional space, the light-field image generation unit 23 captures images of the virtual three-dimensional shape of the object 200 in the virtual three-dimensional space restored by the three-dimensional shape reconstruction unit 22, to generate the light-field images.

Specifically, similarly to the case of FIG. 11, the virtual cameras are arranged in an n×m matrix in the virtual three-dimensional space in which viewing points are shifted from one another by a predetermined distance. Then, images of the object 200 are captured from n×m different positions to generate (acquire) n×m captured images as light-field images.

The light-field image generation unit 23 also writes and stores the generated light-field images in the storage 24.

Figure 3:
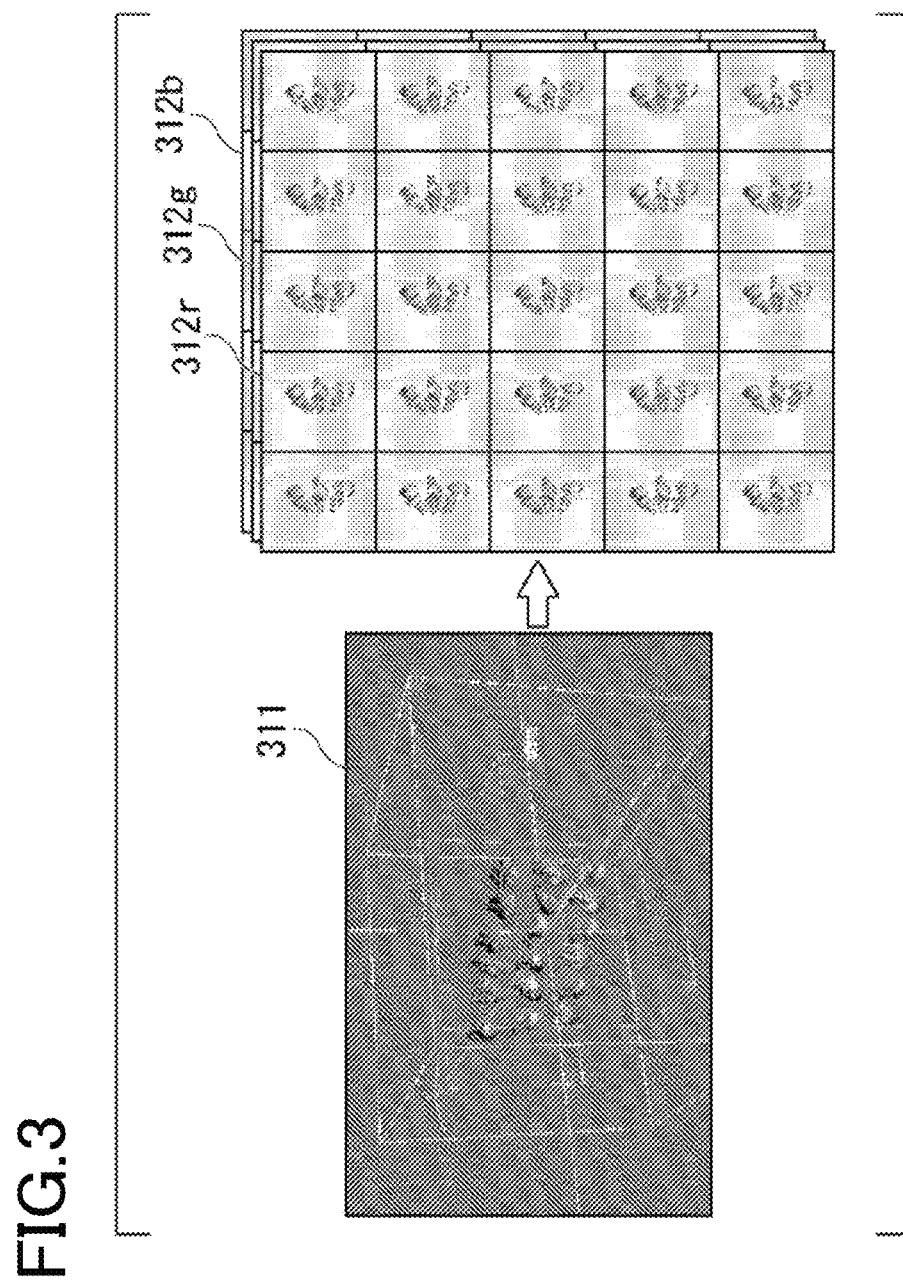
FIG. 3 is a conceptual diagram showing generation of light-field images by capturing a restored virtual three-dimensional shape of an object 200 using virtual cameras arranged in a matrix.

FIG. 3 is a conceptual diagram showing generation of light-field images by capturing a virtual three-dimensional shape of the restored object 200 using virtual cameras arranged in a matrix.

In FIG. 3, a virtual three-dimensional shape 311 of the object 200 in a virtual three-dimensional space is captured from arbitrary viewing points in the virtual space by 25 virtual cameras arranged in a 5 (=n)×5 (=m) matrix to obtain, as light-field images, a red (R) color component gradation image 312*r*, a green (G) color component gradation image 312*g*, and a blue (B) color component gradation image 312*b*.

As a result, in the virtual three-dimensional space, the light-field images composed of the 25 captured images (the captured images composed of the gradation images of the color components R, G, and B) can be easily obtained from any viewing points.

In the case of capturing light-field images in the real space shown in FIG. 11, it is necessary to capture and transmit new light-field images every time capturing from a different viewing point.

In a virtual three-dimensional space, however, a virtual three-dimensional shape is obtained by restoring the three-dimensional shape of the object 200 so that there is no need to restore a new virtual three-dimensional shape later unless there is a change in the shape. Moreover, the light-field images of the virtual three-dimensional shape can be freely obtained from arbitrary viewing points in the virtual three-dimensional space.

Figure 4A:
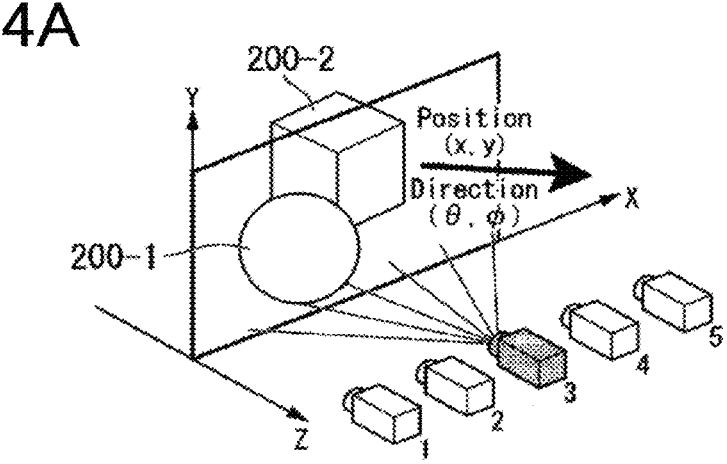
FIGS. 4A, 4B, and 4C are conceptual diagrams describing a light field in a three-dimensional space.
Figure 4B:
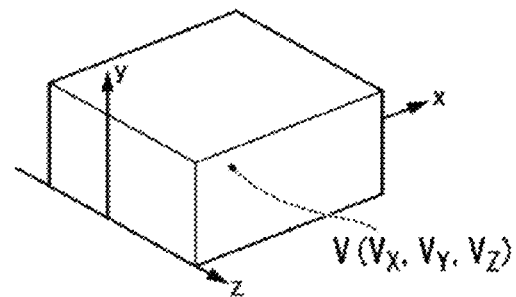
Figure 4C:
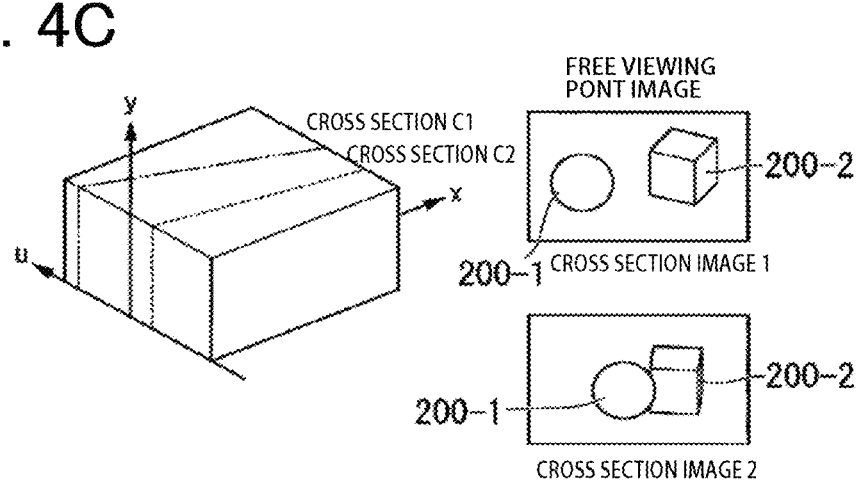

FIGS. 4A, 4B, and 4C are conceptual diagrams describing a light field in a three-dimensional space.

As shown in FIG. 4A, an object 200_1 and an object 200_2 are captured by a plurality of imaging devices (or light-field cameras) arranged in a matrix.

Accordingly, each of the imaging devices captures images, each shifted from one another depending on the viewing points of the arranged positions. Each of the images captures light rays emerging from different parts of the surfaces of the object 200_1 and the object 2002 (light rays from different directions) corresponding to the viewing points of the arranged positions. This makes it possible to obtain information of the light rays emerging to a plurality of directions (light ray directions) at each part of the surfaces of the object 200_1 and the object 200_2.

Each of the captured images is geometrically processed to obtain the light-field (light ray space) information as shown in FIG. 4B.

Luminance along the direction of the light ray at a coordinate point V (Vx, Vy, Vu) in the light ray space shown in FIG. 4B is represented by the equation (1) shown below. In the equation, θ denotes an angle vertical to the light ray direction (an angle in a two-dimensional plane composed of an x axis and a y axis), and φ denotes an angle in a direction parallel to the light ray direction (an angle in a two-dimensional plane composed of the x axis and a u axis).

$$P=P(\theta,\varphi,Vx,Vy,Vu) \quad (1)$$

Therefore, as shown in FIG. 4C, in the light ray space, the two-dimensional images are observed from viewing directions (sight line directions). The images are different from each other similarly to when in real space. The viewing direction here refers to a direction perpendicular to a cross section C1 or a cross section C2 which are obtained by cutting the light ray space along a plane.

The light ray space described above is established for both the virtual three-dimensional shape of the object 200 restored in the virtual three-dimensional space generated based on the light-field images in the real space, and the virtual three-dimensional shape of the object 200 restored in the virtual three-dimensional space of the image generation server 2.

When the image generation server 2 generates the light-field images by using the virtual three-dimensional shape of the object 200 in the virtual three-dimensional space, the viewing positions and the viewing directions of the imaging cameras to generate the light ray space can be set arbitrarily. This makes it possible to capture the light-field images of the object 200 even at a place separated from the object 200 (remote place), similarly to real space.

Figure 5:
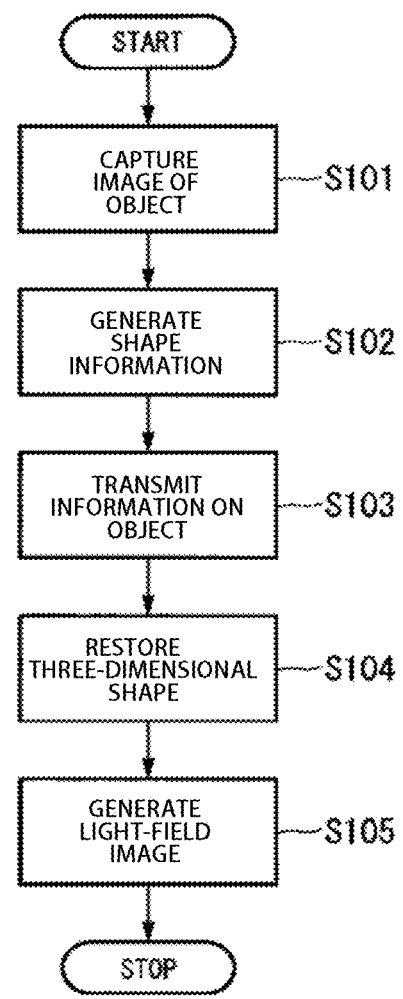
FIG. 5 is a flowchart describing an example of how a light-field image generation is performed based on the light-field image generation system according to the first embodiment.

FIG. 5 is a flowchart describing an operation example of a light-field image generation process based on the light-field image generation system according to the present embodiment.

Step S101:

In a fixed state, each of the imaging device 3_1 and the imaging device 3_2 captures images of the object 200 from predetermined viewing points, at a remote place separated from the place where light-field images are used. For example, the imaging device 3_1 and the imaging device 3_2 may be RGB-D cameras.

Each of the imaging device 3_1 and the imaging device 32 outputs geometric information #1 and geometric information #2 to the shape information acquisition server 1. These pieces of information indicate the three-dimensional shape of the object 200 at the respective viewing points.

The captured image input unit 11 writes and stores the geometric information #1 and the geometric information #2 in the storage 14. Both of these are supplied from the imaging device 31 and the imaging device 3_2.

Step S102:

The three-dimensional shape information generation unit 12 reads the geometric information #1 and the geometric information #2 from the storage 14, establishes consistency between feature points of the geometric information #1 and the geometric information #2, and integrates the feature points of the geometric information #1 and the geometric information #2.

Based on gradation information and depth information of the geometric information #1 and the geometric information #2, the three-dimensional shape information generation unit 12 generates a three-dimensional point group (or depth images) indicating the three-dimensional shape of the object 200 as geometric information in the virtual three-dimensional space. The three-dimensional shape information generation unit 12 adds gradation information of the color components RGB as color information to the feature points of the three-dimensional point group (or depth images) to generate the three-dimensional shape information of the object 200.

The three-dimensional shape information generation unit 12 writes and stores the data of the generated three-dimensional shape information in the storage 14.

Step S103:

The three-dimensional shape information output unit 13 reads the three-dimensional shape information from the storage 14 and outputs the same to the image generation server 2 via the information communication network 500.

As described above with reference to FIGS. 12, 13A and 13B, as the geometric information, each of the depth information and the color information of the feature points of the three-dimensional shape is transmitted as the three-dimensional shape information composed of the depth images and color images having geometric consistency. Then, by using a general image compression technique, the data amount is decreased. Therefore, the load of transmission (transmission amount) of the three-dimensional information is further decreased.

The three-dimensional shape information input unit 21 writes and stores the data of the three-dimensional shape information of the object 200 supplied from the shape information acquisition server 1, to the storage 24.

Step S104:

The three-dimensional shape reconstruction unit 22 reads the data of the three-dimensional shape information which is used as the light-field information, from the storage 24. Then, the unit reconstructs (restores) the three-dimensional shape of the object 200 in the virtual three-dimensional space to generate the virtual three-dimensional shape of the object 200.

The three-dimensional shape reconstruction unit 22 writes and stores the data of the virtual three-dimensional shape generated in the three-dimensional virtual space, to the storage 24.

Step S105:

The light-field image generation unit 23 reads the virtual three-dimensional shape from the storage 24, and captures light-field images of the virtual three-dimensional shape by using virtual cameras (light-field cameras) at arbitrary viewing points in the virtual three-dimensional space.

The light-field image generation unit 23 writes and stores the captured light-field images in the storage 24.

In the configuration described above, according to the present embodiment, the shape information acquisition server 1 acquires the three-dimensional shape information of the object 200. Then, the data of the three-dimensional shape information is transmitted to the image generation server 2. After that, the image generation server 2 restores the virtual three-dimensional shape of the object 200 based on the supplied three-dimensional shape information. Thus, when one of the shape information acquisition server 1 and the image generation server 2 is located relatively distant from the other, the three-dimensional shape information such as the three-dimensional point group and the color information is transmitted as the light-field information. This decreases the communication load of data transmission/reception in the information communication network 500 and allows high-speed transmission of the light-field information as compared to the case of transmitting the light-field images without any processing.

According to the present embodiment, at a remote place where the object 200 is located, it is possible to obtain the light-field images at higher speed.

According to the present embodiment, the virtual three-dimensional shape of the object 200 is restored in the virtual three-dimensional space, which makes it possible to enlarge or reduce the virtual three-dimensional space to an arbitrary size, and easily obtain the light-field images from arbitrary viewing points by using virtual cameras.

Second Embodiment

Figure 6:
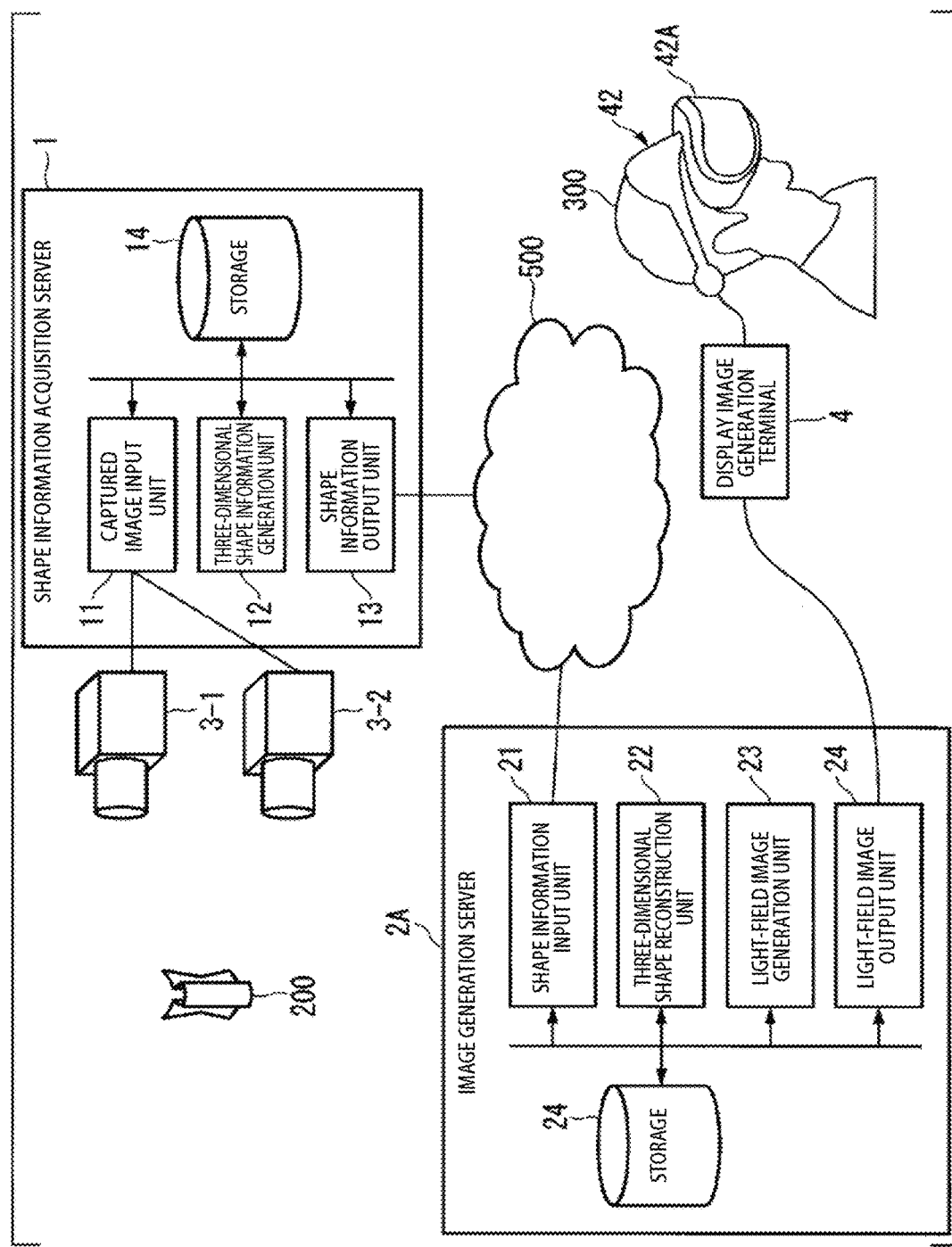
FIG. 6 is a diagram showing a configuration example of an image display system according to a second embodiment using the light-field image generation system of the present invention.

Hereinafter, as a second embodiment of the present invention, an image display system using the light-field image generation system according to the first embodiment of the present invention will be described with reference to the drawings. FIG. 6 is a diagram showing a configuration example of an image display system according to the second embodiment using the light-field image generation system according to an embodiment of the present invention.

Hereinafter, description will be given only of components and operations of the second embodiment shown in FIG. 6 that are different from those of the first embodiment shown in FIG. 1. The shape information acquisition server 1 is configured in the same manner as that of the first embodiment. An image generation server 2A is configured such that a light-field image output unit 25 is added to the image generation server 2 of the first embodiment. The image display system additionally has an HMD 42 including a display image generation terminal 4 and a display unit 42A. In the present embodiment, the display image generation terminal 4 and the HMD 42 may be integrated. For example, the function of the display image generation terminal 4 may be included in the functional part of the HMD 42.

The light-field image output unit 25 reads the light-field images generated by the light-field image generation unit 23 from the storage 24. The light-field image output unit 25 outputs the read light-field images to the display image generation terminal 4.

Based on the light-field images supplied from the light-field image output unit 25, the display image generation terminal 4 generates a display image which is to be displayed on the display unit 42A of the HMD 42. The display image generation terminal 4 outputs the generated display image to the HMD 42 (an example of a display device).

The HMD 42 displays the display image supplied from the display image generation terminal 4 to the display unit 42A using an internal display control unit (not shown). The HMD 42 is attached to the head of an observer who observes the virtual three-dimensional shape of the object 200.

Figure 7:
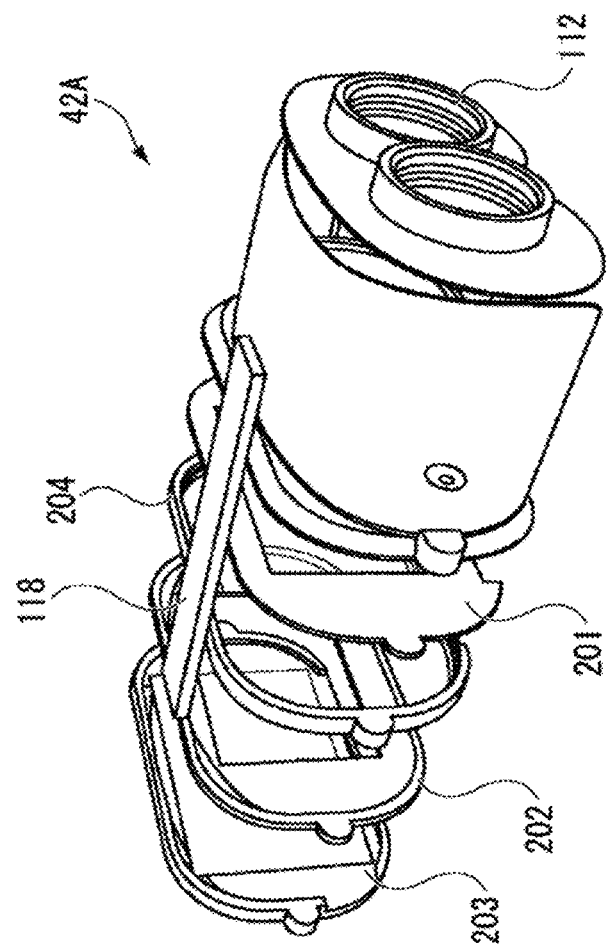
FIG. 7 is a conceptual diagram showing a configuration example of a display unit 42A of an HMD 42 according to the second embodiment.

FIG. 7 is a conceptual diagram showing a configuration example of the display unit 42A of the HMD 42 according to the present embodiment. As shown in FIG. 7, the display unit 42A is configured such that two liquid crystal panels, a front liquid crystal panel 201 as a front transparent display and a rear liquid crystal panel 202 as a rear display, face each other and stacked such that their display surfaces are in parallel to each other and corresponding pixels overlap in a plan view. The front liquid crystal panel 201 is arranged closer to the observer's eye (ocular lenses 112) than the rear liquid crystal panel 202. In the present embodiment, the display unit 42A is composed of the two liquid crystal panels. However, the display unit 42A may be composed of a stack of three or more liquid crystal panels. In the plurality of liquid crystal panels, each of the liquid crystal panels other than the rear display arranged on the rear side (the rear liquid crystal panel 202), that is, the liquid crystal panels arranged in front of the rear display is transparent.

Each of the front liquid crystal panel 201 and the rear liquid crystal panel 202 is arranged such that display surfaces thereof are parallel to a plane orthogonal to the optical axes of the ocular lenses 112.

A spacer 204 having a predetermined width (along the optical axis) is provided between the front liquid crystal panel 201 and the rear liquid crystal panel 202 to separate their display surfaces with a predetermined spacing.

The ocular lenses 112 are positioned such that the optical axis is perpendicular to the display surfaces of the front liquid crystal panel 201 and the rear liquid crystal panel 202.

The rear liquid crystal panel 202 has the display surface facing toward the front liquid crystal panel 201, and a back surface opposite to that facing the display surface. A backlight 203 is positioned to face the back surface of the rear liquid crystal panel 202.

According to the configuration of the display unit 42A described above, the observer wearing the HMD 42 can observe the front liquid crystal panel 201 and the rear liquid crystal panel 202 via the ocular lenses 112 to visually recognize the stereoscopic effect of the virtual three-dimensional shape of the object 200. This visual recognition is achieved by the light field (light ray space) composed of the light rays emerging from the front liquid crystal panel 201 and the rear liquid crystal panel 202.

As described above, in FIG. 11, the light-field images 402 are a plurality of images captured by the imaging device arranged in a matrix. For the observer to visually recognize the stereoscopic virtual three-dimensional shape, it is necessary to display the light-field images 402 on the front liquid crystal panel 201 and the rear liquid crystal panel 202, as predetermined images. That is, the predetermined images are displayed on the front liquid crystal panel 201 and the rear liquid crystal panel 202 to form the light field where the light rays emerging from the surface of the three-dimensional shape are reproduced. Accordingly, a combination of overlapping pixels may differ depending on an observer's eye focus, in the front liquid crystal panel 201 and the rear liquid crystal panel 202, if observed from arbitrary cross sections in the light field (for example, viewing directions of the cross section C1 and the cross section C2) as shown in FIGS. 4A, 4B and 4C. Thus, the light ray direction and luminance of the light passing through the overlapping pixels on the front liquid crystal panel 201 and the rear liquid crystal panel 202 vary depending on the observer's eye focused position so that different parts of the virtual three-dimensional shape are observed. This allows the observer to visually recognize the stereoscopic virtual three-dimensional shape on the display unit 42A due to his/her eye's focusing function.

Figure 8:
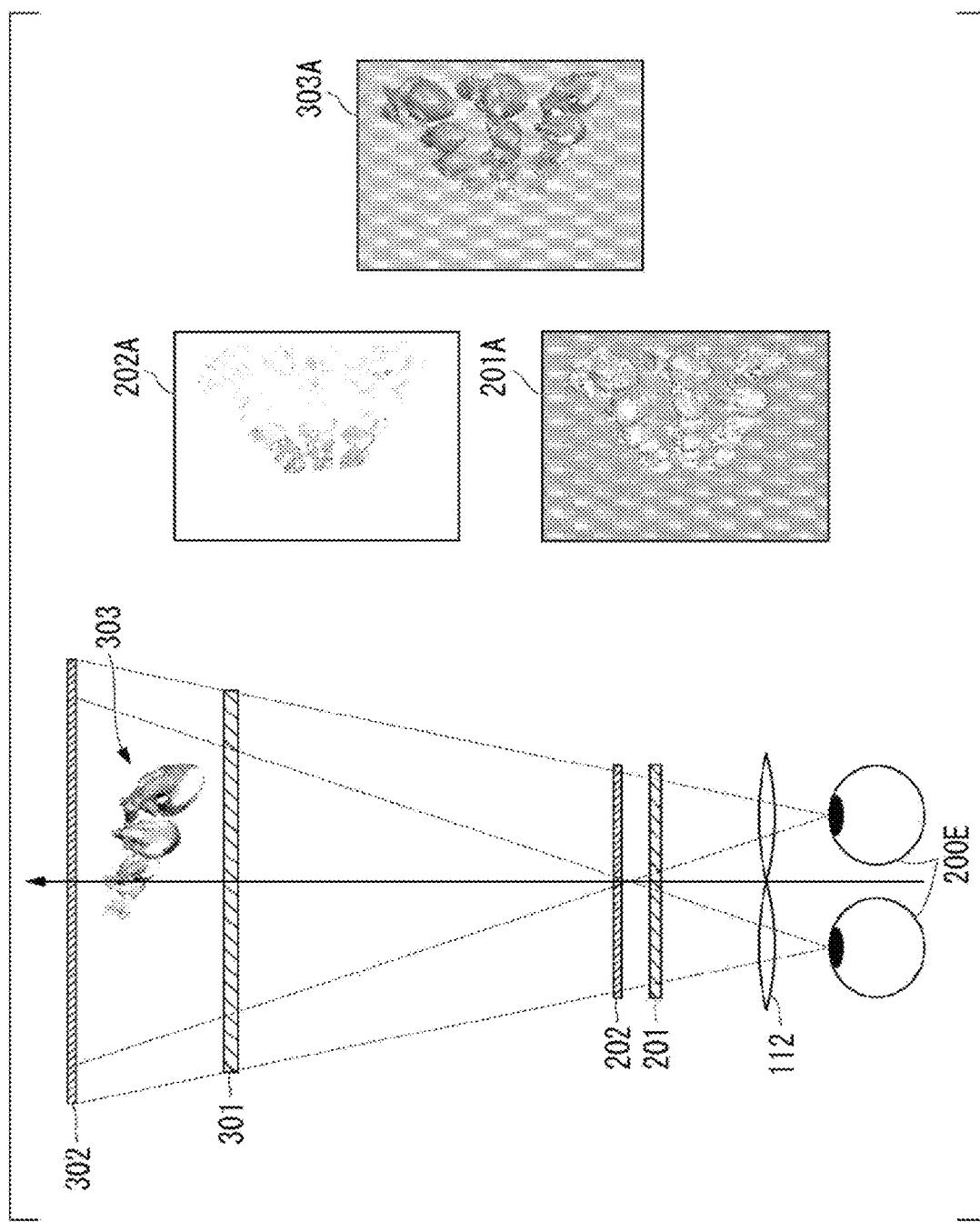
FIG. 8 is a conceptual diagram describing correspondence between light-field images and display images displayed on the display unit 42A.

FIG. 8 is a conceptual diagram describing correspondence between light-field images and display images on the display unit 42A.

The front liquid crystal panel 201 and the rear liquid crystal panel 202 display a display image 201A and a display image 202A, respectively. The display image 201A and the display image 202A are images in which light ray information of the light field in the light-field image is compressed.

Each of the display image 201A and the display image 202A has information on positions and directions in which the light rays are to be emerged in the light field of the light-field images. The compression of the light-field images is performed by compressing the light rays information in the light-field images according to the number of the liquid crystal panels, based on a non-negative matrix factorization method (rank-1 NMF method).

In FIG. 8, as a result of the compression described above, the display image 202A generated from the light-field image 312 (FIG. 3) is displayed on the rear liquid crystal panel 202, and the display image 201A is displayed on the front liquid crystal panel 201.

As a result, the display image 201A and the display image 202A displayed on the display image 201A and the display image 202A are formed on the retinas of the observer's eyes 200E. At this time, formed on the observer's eye retinas via the ocular lenses 112 are the display image 201A and the display image 202A respectively displayed in a virtual manner on a virtual screen 301 and a virtual screen 302 separated from each other by a predetermined distance. The virtual screen 301 corresponds to the front liquid crystal panel 201, and the virtual screen 302 corresponds to the rear liquid crystal panel 202.

Accordingly, the observer observes the overlapping of the display image 201A and the display image 202A, respectively displayed on the front liquid crystal panel 201 and the rear liquid crystal panel 202.

As described above, the light ray direction and luminance of the light passing through the overlapping pixels on the front liquid crystal panel 201 and the rear liquid crystal panel 202, that is, the overlapping of each of the pixels in the display image 201A and the display image 202A vary depending on the observer's eye focusing position. This allows the observer to observe an observation image 303A (a two-dimensional image obtained by projecting the virtual three-dimensional shape onto a cross section) corresponding to the viewing point in the light-field, and visually recognize the stereoscopic virtual three-dimensional shape on the display unit 42A.

Figure 9:
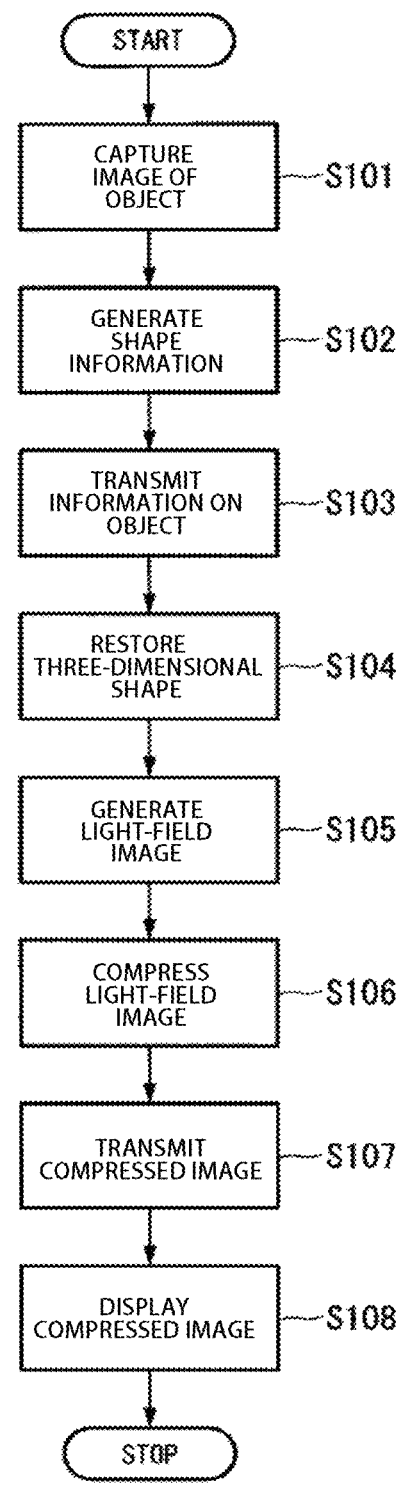
FIG. 9 is a flowchart describing an example of how a display image generation is performed for stereoscopic viewing of a virtual three-dimensional shape based on the image display system according to the present embodiment.

FIG. 9 is a flowchart of a display image generation process in which a virtual three-dimensional shape is stereoscopically viewed based on the image display system according to the present embodiment. In FIG. 9, steps S101 to S105 are the same as steps S101 to S105 shown in FIG. 5. Hereinafter, steps S106 to S108 will be described.

Step S106:

The light-field image output unit 25 transmits the light-field images generated by the light-field image generation unit 23 based on the information from the storage 24, to the display image generation terminal 4.

The display image generation terminal 4 compresses the light-field images supplied from the image generation server 2 to generate the display image 201A and the display image 202A to be respectively displayed on the front liquid crystal panel 201 and the rear liquid crystal panel 202.

Step S107:

The display image generation terminal 4 outputs the display image 201A and display image 202A to the HMD 42.

Step S108:

The display control unit of the HMD 42 displays the display image 201A and the display image 202A on the front liquid crystal panel 201 and the rear liquid crystal panel 202, respectively.

In the configuration described above, according to the present embodiment, the shape information acquisition server 1 acquires the three-dimensional shape information of the object 200 and transmits the data of the three-dimensional shape information to the image generation server 2.

The image generation server 2 restores the virtual three-dimensional shape of the object 200 based on the supplied three-dimensional shape information. Thus, when the shape information acquisition server 1 and the image generation server 2 are located at a remote place, the three-dimensional shape information such as the three-dimensional point group and the colors are transmitted as the light-field information. This makes it possible to reduce the communication load on the information communication network 500 and obtain the light-field information and generate the light-field images at higher speed as compared to the case of transmitting the light-field images without any processing.

Thus, according to the present embodiment, at a remote place where the object 200 is located, it is possible to generate the display images based on the light-field images and supply the same to the HMD 42 at higher speed than ever before.

As described above, in the present embodiment, the display unit 42A of the HMD 42 as the light-field display has a plurality of liquid crystal panels. Alternatively, the light-field display may be configured in a parallax barrier system in which a parallax barrier is used to spatially assign a field of view and a display unit is used to display the light rays in the light field. As another alternative, the light-field display may be configured in a lenticular system in which a micro-lens array of lenticular lenses is used to spatially assign a field of view and a display unit is used to display the light rays in the light-field. As yet another alternative, the light-field display may be configured of a system using a diffraction grating and a display. In any of these systems, the display image generation terminal 4 generates the display image corresponding to the system of respective configuration of the light-field display, based on the light-field images.

Third Embodiment

Figure 10:
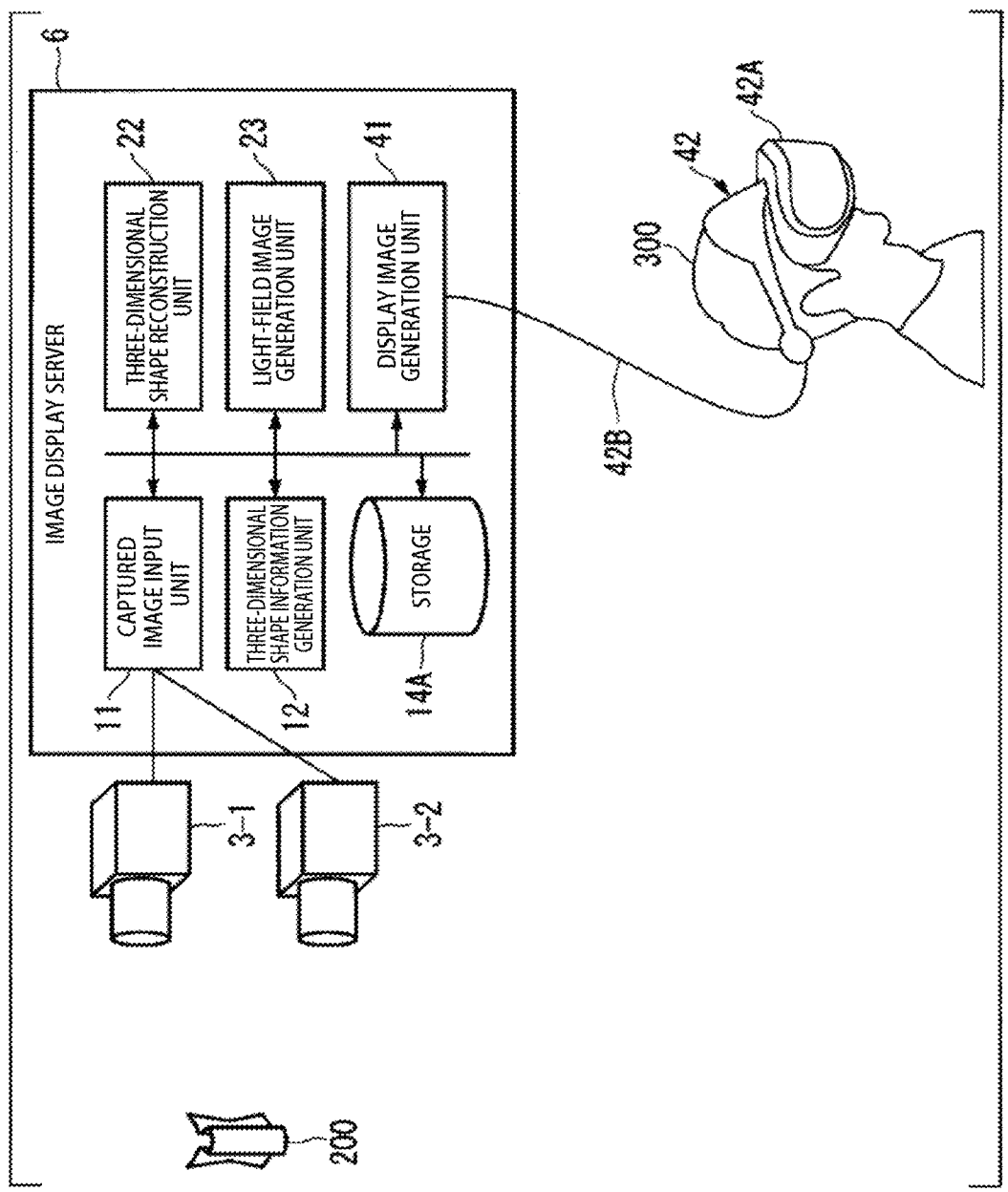
FIG. 10 is a diagram showing a configuration example of an image display system using an image display server 6 according to a third embodiment of the present invention.

Hereinafter, as a third embodiment of the present invention, an image display system using an image display server 6 in which the shape information acquisition server 1 according to the first embodiment of the present invention and the image generation server 2 according to the second embodiment are combined will be described with reference to the drawings. FIG. 10 is a diagram showing a configuration example of the image display system using the image display server 6 according to the third embodiment of the present invention.

In FIG. 10, the image display server 6 includes the captured image input unit 11 and the three-dimensional shape information generation unit 12 in the shape information acquisition server 1 according to the first embodiment, the three-dimensional shape reconstruction unit 22 and the light-field image generation unit 23 in the image generation server 2 according to the first embodiment, and a display image generation unit 41 having the function of the display image generation terminal 4 according to the second embodiment. A storage 14A is configured such that the storage 14 in the shape information acquisition server 1 and the storage 24 in the image generation server 2 are integrated.

The three-dimensional shape information generation unit 12 generates, in a virtual three-dimensional space, a three-dimensional point group (or depth images) of feature points of the object 200 and color information of the feature points as three-dimensional shape information, and writes and stores the same in the storage 14A.

The three-dimensional shape reconstruction unit 22 reads the three-dimensional shape information from the storage 14A, reconstructs the three-dimensional shape of the object 200 as a virtual three-dimensional shape, based on the three-dimensional point group (or the depth images) that is the depth information in the virtual three-dimensional space and the color information of the feature points in the three-dimensional point group, and writes and stores the virtual three-dimensional shape in the storage 14A.

The light-field image generation unit 23 reads the virtual three-dimensional shape of the object 200 from the storage 14A.

In the virtual three-dimensional space, the light-field image generation unit 23 captures images of the virtual three-dimensional shape of the object 200 using virtual cameras from arbitrary viewing directions to generate light-field images, and writes and stores the light-field images in the storage 14A.

The display image generation unit 41A reads the light-field images from the storage 14A, performs the compression process described above on the light-field images, and outputs the display image 201A and display image 202A to the HMD 42 via a cable 42B or in a wireless manner. As described in the second embodiment, the light-field display may not be the stacked display system of the HMD 42 but may be the display of parallax barrier system or lenticular system.

As described above, according to the present embodiment, the virtual three-dimensional shape of the object 200 is restored in the virtual three-dimensional space. This allows the observer to form the light field (light ray space) in an arbitrary viewing direction. Thereby, the observer can avoid problems in the imaging step because, unlike conventional cases, there is no need to capture light-field images at each change of the viewing direction.

According to the present embodiment, the image display server 6 compresses the light-field images and generates the display image 201A and the display image 202A to be displayed on the display unit 42A of the HMD 42. This increases the processing speed and allows real-time generation of the moving image so that the observer can observe the virtual three-dimensional shape without delay.

According to the present embodiment, instead of the light-field images, the display image 201A and the display image 202A are outputted to the HMD 42 via the cable 42B or in a wireless manner. This reduces the load of data transfer and increases the transmission speed to allow real-time display of images such as a moving image on the display unit 42A. Accordingly, the observer can observe the virtual three-dimensional shape on the HMD 42 without delay.

Programs for implementing the functions of the shape information acquisition server 1 and the image generation server 2 shown in FIG. 1, the image generation server 2A and the display image generation terminal 4 shown in FIG. 6, and the image display server 6 shown in FIG. 10 may be recorded on a computer-readable medium. Then, the programs recorded on the medium may be read by a computer system and may be executed to control capture of the light-field images of the virtual three-dimensional shape of the object and generation of display images displayed on the display unit of the HMD. The computer system herein refers to one that includes an operating system (OS) and hardware such as peripheral devices.

The "computer system" also includes a WWW system in an environment for providing (displaying) websites. The computer-readable recording medium refers to a storage device such as a flexible disk, a magnetooptical disk, a ROM, a portable medium such as a CD-ROM, or a hard disk incorporated in a computer system. The "computer-readable recording medium" also includes an object holding the program for a certain period of time, such as a volatile memory (RAM) in the computer system as a server or a client in the case where the program is transmitted via a network such as the internet or a communication line such as a telephone line.

Furthermore, the above program may be transmitted from a computer system that stores the program in a storage device or the like to another computer system via a transmission medium or transmission waves in a transmission medium. The transmission medium that transmits the program refers to a medium having a function of transmitting information, including a network (communication network) such as the internet, and a communication circuit (communication line) such as a telephone line. The above program may be the one that implements part of the above functions. Further, the program may be a differential file (differential program) which implements the above functions when combined with a program pre-recorded in the computer system.

The present application addresses the following. Acquiring the light-field information of the object to be dealt with, generating an image corresponding to the light-field information, and displaying the image on the HMD allows the worker to focus his/her eye on the desired depth position in the three-dimensional shape of the object in the same image.

The use of the light-field information achieves consistency between the ocular convergence and focus adjustment of the worker to prevent eyestrain and visually induced fatigue, so that the worker may conduct delicate work and long-duration work more easily.

However, the light-field information is regarding light rays in a light field. More specifically, it is information on light rays in a light field that is obtained from a collection of plurality of captured images (light-field images), for example, an n×m matrix, in which each image is captured such that viewing point is shifted by a predetermined distance.

As shown in FIG. 11, an object 403 is captured by n×m imaging devices 401 in which each has different viewing point (capture position). Further, the viewing points are shifted in x direction and y direction on the same plane. For example, the object 403 may be captured by nine imaging devices 401 arranged at three×three positions of nine different viewing points. Then, the nine captured images which each have different viewing point are generated as light-field images 402 having information on light rays along the nine directions from the object 403 (light-field information). In the diagram, θ represents an angle formed by an axis vertically passing through the center of the light-field image and a y axis on the plane. φ represents an angle formed by an axis vertically passing through the center of the light-field image and an x axis on the plane.

Each of the light-field images 402 is captured at a predetermined resolution and thus each of pixels has gradations corresponding to the resolution. Therefore, the data amount of the light-field information is represented by (the number of pixels×gradations)×the number of the light-field images, which is quite large.

Thus, when the light-field images captured at a remote site are transmitted to a server that performs a process of displaying the light-field images on the HMD, the transmission of data of the light-field information requires a large amount of time because the amount of data to be transmitted is quite large, and thus, increases communication load.

The time-consuming transmission of the light-field image data requires periodic updates of the light-field information for display of images, especially moving images, on the HMD. This may cause a delay in the transmission of the light-field information so that image display processing in the HMD becomes retarded or images are skipped. These events may cause an obstacle to teleoperation work.

An aspect of the present invention is to provide a light-field image generation system, an image display system, a shape information acquisition server, an image generation server, a display device, a light-field image generation method, and an image display method that make it possible to reduce communication load by decreasing the amount of light-field information to be transmitted, thereby suppressing delay of the process for displaying images and image missing on the HMD.

A first aspect of the present invention is a light-field image generation system that includes a shape information acquisition server that acquires shape information indicating a three-dimensional shape of an object, and an image generation server that has a shape reconstruction unit that reconstructs the three-dimensional shape of the object as a virtual three-dimensional shape in a virtual space based on the shape information, and a light-field image generation unit that generates a light-field image of the virtual three-dimensional shape at a predetermined viewing point in the virtual space.

A second aspect of the present invention is the light-field image generation system of the first aspect in which the light-field image generation unit in the image generation server may capture an image of the virtual three-dimensional shape using a virtual imaging device based on an arbitrary viewing point and viewing direction in the virtual space, and generate the light-field image based on the arbitrary viewing point and viewing direction.

A third aspect of the present invention is the light-field image generation system of the first or second aspect in which the shape information acquisition server may generate the shape information of the object based on a captured image of the object captured by the imaging device.

A fourth aspect of the present invention is the light-field image generation system of any one of the first to third aspects in which the shape information may be gradation information and depth information in each pixel of the captured image of the object.

A fifth aspect of the present invention is the light-field image generation system of any one of the first to third aspects in which the shape information may be three-dimensional point group information composed of feature points of the object and gradation information at each feature point.

A sixth aspect of the present invention is the light-field image generation system of the fourth or fifth aspect in which the gradation information may be color information of gradations for each of an R color component, a G color component, and a B color component.

A seventh aspect of the present invention is the light-field image generation system in any one of the first to sixth aspects in which the shape information may be composed of information that is extracted from a plurality of captured images captured by a plurality of imaging devices arranged at different viewing points and in different viewing directions.

An eighth aspect of the present invention is an image display system that includes any of the light-field image generation systems described above, an image generation server that generates a display image from a light-field image, and a display device. The display device includes a display unit in which two or more displays including at least a front transparent display and a rear display are arranged such that corresponding pixels overlap in a plan view. The image generation server generates each of display images that are displayed on each of the displays, each of the display images including gradation information of the pixels in the light-field image and the gradation information being compressed.

A ninth aspect of the present invention is a shape information acquisition server included in a light-field image generation system together with an image generation server that has a shape reconstruction unit that reconstructs a three-dimensional shape of an object as a virtual three-dimensional shape in a virtual space based on shape information of the object, and a light-field image generation unit that generates a light-field image of the virtual three-dimensional shape at a predetermined viewing point in the virtual space. The shape information acquisition server acquires the shape information indicating the three-dimensional shape of the object.

A tenth aspect of the present invention is an image generation server included in a light-field image generation system together with a shape information acquisition server that acquires shape information indicating a three-dimensional shape of an object. The image generation server includes a shape reconstruction unit that reconstructs the three-dimensional shape of the object as a virtual three-dimensional shape in a virtual space based on the shape information, and a light-field image generation unit that generates a light-field image of the virtual three-dimensional shape at a predetermined viewing point in the virtual space.

An eleventh aspect of the present invention is a display device that is included in an image display system together with the light-field image generation system of any one of the first to sixth aspects and an image generation server that generates a display image based on a light-field image. The display device includes a display unit in which two or more displays including at least a front transparent display and a rear display are arranged such that corresponding pixels overlap in a plan view. Each of display images generated by the image generation server is displayed on each of the displays, each of the display images being gradation information of the pixels in the light-field image, the gradation information being compressed.

A twelfth aspect of the present invention is a light-field image generation method that includes a shape information acquisition step of acquiring shape information indicating a three-dimensional shape of an object, a shape reconstruction step of reconstructing the three-dimensional shape of the object as a virtual three-dimensional shape based on the shape information in a virtual space, and a light-field image generation step of generating a light-field image of the virtual three-dimensional shape at a predetermined viewing point in the virtual space.

A thirteenth aspect of the present invention is an image display method that includes a shape information acquisition step of acquiring shape information indicating a three-dimensional shape of an object, a shape reconstruction step of reconstructing the three-dimensional shape of the object as a virtual three-dimensional shape based on the shape information in a virtual space, a light-field image generation step of generating a light-field image of the virtual three-dimensional shape at a predetermined viewing point in the virtual space, and a display image generation step of generating each of display images on a display unit in which two or more displays including at least a front transparent display and a rear display are arranged such that corresponding pixels overlap in a plan view, each of the display images being displayed on respective displays, and gradation information of the pixels in the light-field image being compressed.

As described above, according to the foregoing aspects of the present invention, it is possible to provide the light-field image generation system, the image display system, the shape information acquisition server, the image generation server, the display device, the light-field image generation method, and the image display method which reduce communication load by decreasing the amount of information to be transmitted, thereby suppressing a delay in the process of displaying images and skipped images on the HMD.

REFERENCE SIGNS LIST

1 . . . Shape information acquisition server
2 . . . Image generation server
3-1, 3-2 . . . Imaging device
4 . . . Display image generation terminal
11 . . . Captured image input unit
12 . . . Three-dimensional shape information generation unit
13 . . . Three-dimensional shape information output unit
14, 14A, 24 . . . Storage
21 . . . Three-dimensional shape information input unit
22 . . . Three-dimensional shape reconstruction unit
23 . . . Light-field image generation unit
24 . . . Storage
25 . . . Light-field image output unit
41 . . . Display image generation unit
42 . . . HMD
42A . . . Display unit
500 . . . Information communication network Obviously, numerous modifications and variations of the present invention are possible in light of the above teachings. It is therefore to be understood that within the scope of the appended claims, the invention may be practiced otherwise than as specifically described herein.

What is claimed is:
1. An image display system, comprising:
a light-field image generation system, comprising:
a shape information acquisition server including first circuitry configured to acquire shape information indicating a three-dimensional shape of an object; and
an image generation server including second circuitry configured to
reconstruct the three-dimensional shape of the object as a virtual three-dimensional shape in a virtual space based on the shape information, and
generate a light-field image of the virtual three-dimensional shape at a predetermined viewing point in the virtual space;
an image generation server including third circuitry configured to generate a display image from a light-field image; and
a display device,
wherein the display device includes a display in which a plurality of displays, including at least a front transparent display and a rear display, are positioned such that corresponding pixels overlap in a plan view, and
the third circuitry of the image generation server is further configured to generate each displayed image that is displayed on each of the displays, each of the displayed images including gradation information of the pixels in the light-field image, the gradation information being compressed.

2. The image display system according to claim 1, wherein the second circuitry of the image generation server is further configured to
    capture an image of the virtual three-dimensional shape using a virtual imaging device based on an arbitrary viewing point and viewing direction in the virtual space, and
    generate the light-field image based on the arbitrary viewing point and viewing direction.

3. The image display system according to claim 1, wherein the first circuitry of the shape information acquisition server is further configured to generate the shape information of the object based on a captured image of the object captured by an imaging device.

4. The image display system according to claim 1, wherein the shape information is gradation information and depth information in each pixel of a captured image of the object.

5. Image display system according to claim 1, wherein the shape information is three-dimensional point group information including feature points of the object and gradation information at each feature point.

6. The image display system according to claim 4, wherein the gradation information is color information of gradations for each of an R color component, a G color component, and a B color component.

7. The image display system according to claim 1, wherein the shape information includes information that is extracted from a plurality of captured images captured by a plurality of imaging devices positioned at different viewing points and in different viewing directions.

8. An image display method, comprising:
    acquiring shape information indicating a three-dimensional shape of an object;
    reconstructing the three-dimensional shape of the object as a virtual three-dimensional shape in a virtual space, based on the shape information;
    generating a light-field image of the virtual three-dimensional shape at a predetermined viewing point in the virtual space; and
    generating displayed images on a display in which a plurality of displays including at least a front transparent display and a rear display are positioned such that corresponding pixels overlap in a plan view, each of the displayed images being displayed on respective displays, and gradation information of the pixels in the light-field image being compressed.

9. The light-field image generation system according to claim 2, wherein the first circuitry of the shape information acquisition server is further configured to generate the shape information of the object based on the captured image of the object captured by the imaging device.

10. The light-field image generation system according to claim 2, wherein the shape information is gradation information and depth information in each pixel of the captured image of the object.

11. The light-field image generation system according to claim 2, wherein the shape information is three-dimensional point group information including feature points of the object and gradation information at each feature point.

12. The light-field image generation system according to claim 10, wherein the gradation information is color information of gradations for each of an R color component, a G color component, and a B color component.

13. The method according to claim 8, wherein the shape information is gradation information and depth information in each pixel of a captured image of the object.

14. The method according to claim 8, wherein the shape information is three-dimensional point group information including feature points of the object and gradation information at each feature point.

15. The method according to claim 8, wherein the gradation information is color information of gradations for each of an R color component, a G color component, and a B color component.

* * * * *